United States Patent
Anderson et al.

(10) Patent No.: US 7,203,644 B2
(45) Date of Patent: Apr. 10, 2007

(54) AUTOMATING TUNING OF SPEECH RECOGNITION SYSTEMS

(75) Inventors: Andrew V. Anderson, Hillsboro, OR (US); Steven M. Bennett, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 572 days.

(21) Appl. No.: 10/036,577

(22) Filed: Dec. 31, 2001

(65) Prior Publication Data

US 2003/0139925 A1     Jul. 24, 2003

(51) Int. Cl.
*G10L 15/06*     (2006.01)
*G10L 15/14*     (2006.01)

(52) U.S. Cl. .................. 704/243; 704/244; 704/255

(58) Field of Classification Search ........... 704/231, 704/239, 243, 244, 251, 252, 255, 257, 270, 704/275
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 5,642,519 A | * | 6/1997 | Martin | 704/9 |
| 5,651,096 A | * | 7/1997 | Pallakoff et al. | 704/275 |
| 5,754,978 A | * | 5/1998 | Perez-Mendez et al. | 704/255 |
| 5,781,887 A | * | 7/1998 | Juang | 704/275 |
| 5,855,000 A | * | 12/1998 | Waibel et al. | 704/235 |
| 5,950,158 A | * | 9/1999 | Wang | 704/244 |
| 6,061,646 A | * | 5/2000 | Martino et al. | 704/3 |
| 6,078,886 A | * | 6/2000 | Dragosh et al. | 704/270 |
| 6,088,669 A | * | 7/2000 | Maes | 704/231 |
| 6,094,635 A | * | 7/2000 | Scholz et al. | 704/270 |
| 6,157,910 A | * | 12/2000 | Ortega | 704/231 |
| 6,188,985 B1 | * | 2/2001 | Thrift et al. | 704/275 |
| 6,275,792 B1 | * | 8/2001 | Lewis | 704/9 |
| 6,526,380 B1 | * | 2/2003 | Thelen et al. | 704/251 |
| 6,532,444 B1 | * | 3/2003 | Weber | 704/257 |
| 6,553,345 B1 | * | 4/2003 | Kuhn et al. | 704/275 |
| 6,701,293 B2 | * | 3/2004 | Bennett et al. | 704/251 |
| 6,704,707 B2 | * | 3/2004 | Anderson et al. | 704/231 |
| 6,754,627 B2 | * | 6/2004 | Woodward | 704/235 |
| 6,760,704 B1 | * | 7/2004 | Bennett | 704/270 |
| 6,898,567 B2 | * | 5/2005 | Balasuriya | 704/231 |
| 6,985,862 B2 | * | 1/2006 | Strom et al. | 704/255 |

\* cited by examiner

*Primary Examiner*—Martin Lerner
(74) *Attorney, Agent, or Firm*—Blakely, Sokoloff, Taylor & Zafman LLP

(57) ABSTRACT

Embodiments of a speech recognition system are disclosed. The system includes at least one recognizer to produce output signals from audio input signals and a feedback module to collect feedback data generated from conversion of the audio input signals to output signals. The system stores the feedback data and may also be adapted to use the feedback data as part of a training set for recognizers in the system, as part of a predictive mechanism, or both.

7 Claims, 5 Drawing Sheets

AUTOMATING TUNING OF SPEECH RECOGNITION SYSTEMS

BACKGROUND

1. Field

This disclosure relates to speech recognition systems, more particularly to methods to automate the tuning of speech recognition systems.

2. Background

Speech recognition systems typically translate from spoken words to either text or command outputs. While these systems have widespread applications, they generally fall into one of two categories.

The first category includes command and control applications. In these applications, the user speaks to an interface using command words and phrases contained in a grammar file. The interface may be any interface that can receive audible signals, including telephones, microphones, sensors, etc. The speech recognizer translates the spoken commands into the command language of the particular application to perform specific tasks. Tasks may include navigation of menus and access to files.

The second category includes dictation systems. In these systems the user dictates into the interface and the speech system produces the corresponding text as output. Generally, the user interface is a microphone connected to a computing platform of some kind, but is not limited to that particular configuration. Tasks include dictating email, composing documents, etc. Note that speech recognizers targeting dictation applications may sometimes be used for command-and-control purposes.

In these types of systems, mechanisms to improve system performance are generally very explicit. During use of these systems, the speech recognition process is not automatically tuned to the usage. The systems may provide a mechanism for system designers or the end user to tune behavior, but it is done separately from the use of the application.

For example, a command and control application may store audio for each interaction with the user. This stored audio may later be analyzed by an application designer and used to improve the data set used to train the speech recognizer. Some dictation packages include a separate application to allow the user to expand the system vocabulary or train the system in the recognition of certain words or phrases. These tuning mechanisms are explicit and separate from the normal, intended use of the system.

These applications do not include the ability to automate system tuning without impacting the user. These features would be useful in tuning systems, as well as providing a means for inexpensive and efficient initialization of these systems.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
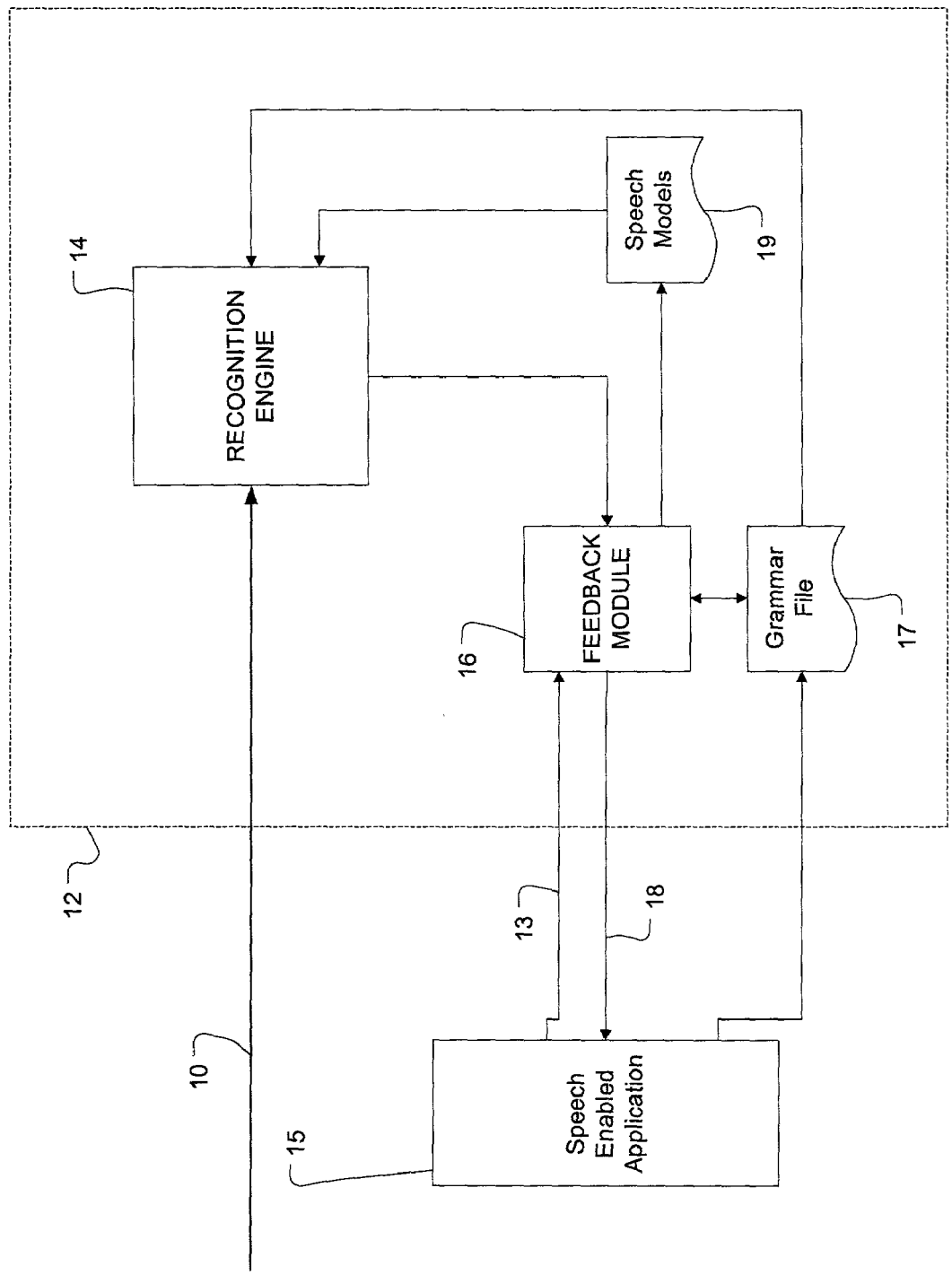
FIG. 1 shows an embodiment of a speech recognition system and application, in accordance with the invention.

FIG. 1 shows an embodiment of a speech recognition system and application, in accordance with the invention. A speech recognition system 12 receives an input stream of audio signals 10 to be converted to output signals 18 by the recognition engine 14, also referred to as a recognizer. A speech-enabled application, referred to here as the "application," 15 makes use of the output signals 18. In the case of command-and-control type applications, the application controls the recognition engine 14 through use of a grammar file 17. The speech recognizer 14 utilizes a set of speech models 19 in performing the speech recognition task of converting the input stream of audio signals 10 to the output signals 18.

The output signals 18 may take many forms. For example, in a dictation system the output signals may be text signals for some sort of word processing or other text application. In some cases, the speech may provide command and control inputs for a user interface for a system, converting the audio input signals of the speech to command output signals.

Command and control applications typically utilize speech recognizers that recognize speech specified in a grammar file. The underlying recognition engine generally has the ability to recognize a wider variety of speech but the outputs of the recognition engine are limited to the contents of the grammar file. Dictation applications typically do not utilize grammar files.

The speech recognition engine 14 utilizes a set of speech models 19 to convert the input audio stream 10 to output signals 18. These speech models 19 include models of the language being spoken, the user, the speech interface, etc. Collectively, these are referred to as speech models in the discussions that follow. Speech models are generally mostly static in nature, they do not change frequently. New models may be generated at appropriate times, generally by the vendor of the speech recognition system or through an explicit interaction with the user. Speech models are typically derived from processing a library of annotated audio signals, where the annotations indicate the correct conversion of the audio to text. This library of annotated audio training data is referred to as a training set.

Feedback data, as the term is used here, is information resulting from monitoring actions of the user in the normal course of interaction with the speech recognition system and application. These actions indicate the accuracy of the recognition conversions. Application of this invention may extract feedback data as a by-product of typical system use. This feedback data may be used in many different ways to improve recognizer and system performance, such as, supplements to training sets, directly improving the speech recognizer accuracy or to train newly installed recognizers or improve prediction mechanisms in multiple predictor systems.

The feedback module 16 collects feedback data generated as a byproduct of the normal usage of the system. This feedback data may be stored for future use or utilized dynamically by the feedback module 16 or recognizers 14 to tune system behavior. Both of these uses are discussed further below. The feedback module 16 may monitor the output signals 18, the grammar files 17, and also receive information 13 directly from the application 15. This is discussed further below. The feedback module 16 is shown as being separate from the recognition engine 14 although it could be part of the recognizer. Alternatively, it may be part of a system controller, or it may be part of another system component.

User actions monitored to generate feedback data may be implicit or explicit. The user gives implicit feedback as the user reacts to responses from the system. If the user says an utterance and the system replies "Calling Rob," the user may stop the call, implying that the recognition result was incorrect. If the user does not react that may imply a correct recognition result for the waveform associated with the result "Rob." Explicit feedback would be if the system prompted the user to confirm or reject the result. For example, the user makes an utterance and the system then asks, "Do you want me to call Rob?" The user answers "yes" or "no", either verbally or with another type of input, such as a function key. The answer to the question is a strong indication of the accuracy of the recognition process. In dictation applications, corrections to recognized text may be viewed as explicit feedback.

This feedback data may be determined by the feedback module or explicitly generated and provided to the feedback module through a number of mechanisms. The feedback module may provide an application program interface (API) for use by the application. This is shown in FIG. 1 as path 13. These APIs may include callback functions that an application program using the recognition system may call. Alternatively, the application may annotate the grammar file in use to indicate that particular entries in the grammar file validate or invalidate the recognition results from a previous utterance. Examples of this are discussed below.

Finally, the speech recognition system may generate or collect feedback for its own use, without application involvement. For example, the feedback module may monitor the grammar files in use and the results from the speech recognizer. It may analyze the grammar files and recognize repeated use of certain portions of the grammars, or repeated occurrences of certain output strings as indications of correct or incorrect recognition. Alternatively, as described below, it may detect the use of speech templates that may indicate that the recognition process was successful or unsuccessful. A variety of mechanisms are possible here and the invention is not limited in this regard. Examples of this method of feedback collection are detailed below.

The feedback utilization mechanisms could take several forms. Two examples are discussed here and additional example usages are discussed after presentation of the multiple recognizer systems shown in FIG. 2 and FIG. 3. The feedback data may be utilized in real-time or could be used off-line, after the user has terminated the session.

The feedback module 16 may actively modify the grammar files 17 and speech models 19 in use by the application 15 and recognition engine 14 based on feedback data. The system may generate an annotated or updated grammar file that indicates a weighting for possibilities in the grammar file based on the feedback data. For example, a grammar file may consist of a large number of names that the user may attempt to phone such as from a list of contacts using language such as "phone Rob". Some speech recognizers accept annotations to the grammar files that indicate the probability of a particular entry being activated by the user. The grammar file may be annotated to indicate which names are more likely to be selected by the user based on prior activity. For example, if the user has said "call Rob" many times and the user has never said "call Bob" then the feedback module may weight the "call Rob" option much more heavily than "call Bob". Note that the feedback module may perform this annotation independently of, and invisibly to, the application. Alternatively, the feedback may be used to explicitly tune the speech models used by the speech recognizer. For example, the system may automatically make use of the feedback data to periodically update speech models without requiring user action. Additionally, the stored feedback data may be utilized to train a new speech recognizer installed in the system, again without requiring user action. These mechanisms are applicable in single recognizer and multiple recognizer systems.

Figure 2:
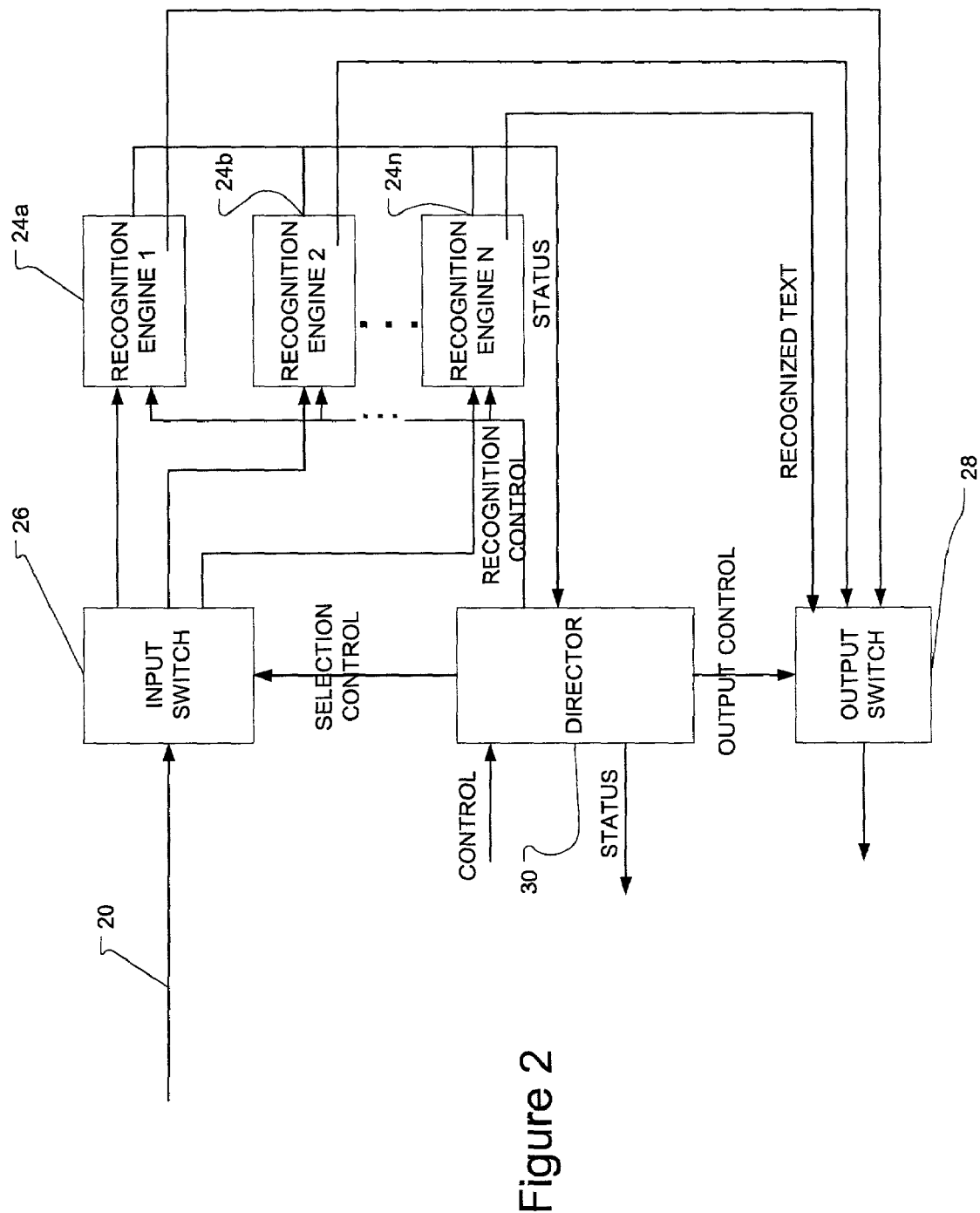
FIG. 2 shows an alternative embodiment of a speech recognition system, in accordance with the invention.

The system shown in FIG. 1 has only one recognition engine 14. An embodiment of a multiple recognizer system is shown in FIG. 2. The input stream 20 now enters the system through an input switch 26, which will route the input stream to one or more available recognizers 24a–24n. The routing may take into account such things as system load, the load at individual recognizers, as well as routing streams from certain types of interactions to recognizers optimized for that type of interaction. For example, recognition engine 24a may be optimized for a dictation application, while recognition engine 24b may be optimized for a command and control interface. The input switch may determine the type of interaction on a particular incoming stream and direct it to an appropriate recognizer based upon that type.

The embodiment of FIG. 2 includes a director 30 that routes traffic and passes a status signal back to whatever application is utilizing the speech recognition engine, not shown. The director also determines which of the recognized text lines coming into the output switch 28 becomes the output of the switch at what time. For example, several different output streams may be multiplexed onto the one output line by the output switch 28.

In this particular embodiment of a speech recognition system, the director 30, or the individual recognition engines 24a–24n would utilize the feedback data. As discussed above, individual recognition engines 24a–24n may utilize this data to expand or correct their individual speech models. The director module may annotate the active grammar file. Additionally, the feedback data may be used to construct a training set supplement for the recognizers or to train a newly installed recognizer.

Figure 3:
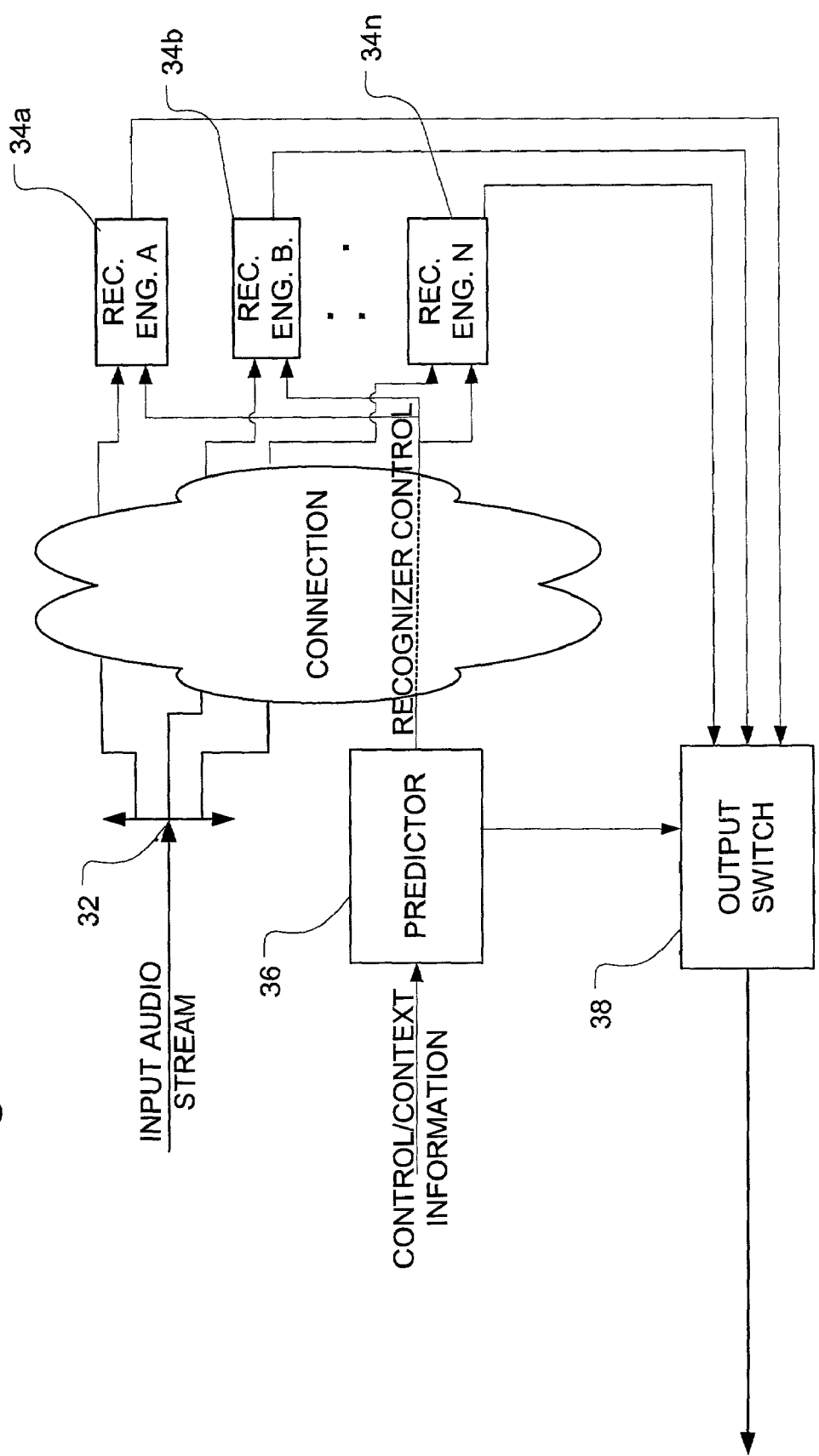
FIG. 3 shows another alternative embodiment of a speech recognition system, in accordance with the invention.

A multiple recognizer system with a predictor is shown in FIG. 3. A predictor 36 attempts to select the recognizer 34a–34n that will perform most accurately for a particular input stream. Contextual information such as channel characteristics, user characteristics, and nature of the interaction, etc., and past performance of the predictor in light of all of this contextual information, is used to pick the best recognition engine. The predictor picks the one thought to be the most accurate and then enables the output stream from that recognizer at the output switch 38.

The feedback data could be used to analyze the performance of the recognition engines and compare their actual performance to the predicted performance. These parameters are then updated to reflect the actual performance and to increase the accuracy of the predictor. The scores or ratings for each recognizer for a particular contextual parameter, such as the channel characteristics, may also be updated to reflect the actual performance.

Having discussed the overall system architecture possibilities, it is helpful to discuss a few examples of a process of operating these systems for both feedback collection and feedback utilization. The following example illustrates these component interactions for a simple case in a telephony-based or command-and-control system. In this example, the user has given a command that was incorrectly recognized by the recognizer(s). The user corrects this problem by reissuing the command.

| 1. User: | Call Julie |
| 2. System: | Now dialing Judy Flynn... |
| 3. User: | No, call Julie Thomson... |
| 4. ... | |

After step 3, the application knows that there has been an error and can indicate the problem to the speech recognition system. As discussed above, making a call to an API designed for this purpose may accomplish this. Alternatively, the grammar file provided to the speech recognition system for step 3 may have included annotations indicating that if the "No, call . . . " option is exercised then an error in the prior dialog state is indicated. This is detailed below. In both cases, the application is associating a response, lack of response, or affirmative responses with a previous recognition result. In this case, the result from step 1 was incorrect. The correction indicates that the recognizer or recognizers incorrectly recognized the audio input signal. The audio stream associated with this utterance could be captured for future use. Depending on the nature of the term and the correction, this information could automatically be matched with the correct utterance. This could be fed into a future training set.

In the following example, the user implicitly confirms the result of step 1.

| 1. User: | Call Julie |
| 2. System: | Now dialing Julie Thomson... |
| 3. User: | <No utterance><ring>... |
| 4. ... | |

In this case, the lack of response by the user at step 3 is an implicit confirmation that the recognition at step 1 was correct. The application can recognize this fact at step 4 and provide information to the recognition system indicating the correctness of the processing at step 1. As in the previous example, annotations to the grammar files may be used for this purpose. Additionally, the audio data from step 1, along with the corrected recognition result and additional contextual information, may be captured to be used as further training data or off-line analysis.

Lastly, the user may explicitly confirm a recognition result. Two examples of this are shown below:

| 1. User: | Call Julie |
| 2. System: | Now dialing Julie Thomson... |
| 3. User: | OK<ring>... |
| 4. ... | |

In this case, no response is necessary in step 3 but the user gives a positive response. In the last example below, a response is required.

| 1. System: | Please state your credit card number |
| 2. User: | 6011 1234 1234 1234 |
| 3. System: | Your number is 6011 1234 1234 1234. Is this correct? Please say 'yes' or 'no' |
| 4. User: | Yes... |
| 5. ... | |

In both of these cases, the user has explicitly confirmed the recognition result. As in the previous example, this information can be provided to the recognition system.

Referring to the examples given above, the following discussions describe a possible method for annotating the grammar files to collect the feedback data. The grammar files shown below use a syntax that is similar to the Java Speech Grammar Format (JSGF), though they are greatly simplified for this discussion. In this simplified syntax, elements in parentheses are optional, elements in all capitals are non-terminal symbols and elements within curly braces are system events. Note that the syntax here is for discussion purposes and the invention is not limited to this form of grammar file or the syntax of the grammar file or annotations.

Initially, the application may utilize the following grammar file (for step 1 in the first 3 examples, above), which does not include any annotations:

```
Public [COMMAND];
    [NAME] =    Rob (Peters)
                | Bob (Johnson)
                | Julie (Thompson)
                | Judy (Flynn);
    [COMMAND] = call [NAME];
```

This grammar file recognizes the phrases "call Rob", "call Rob Peters", "call Bob", "call Bob Johnson", "call Julie", "call Julie Thompson", "call Judy" and "call Judy Flynn". For step 3 in these examples, the application may use the following annotated grammar file:

```
Public [COMMAND];
    [NAME] =    Rob (Peters)
                | Bob (Johnson)
                | Julie (Thompson)
                | Judy (Flynn);
    [NORMAL] = call [NAME];
    [COMMAND] =  [NORMAL] (result[-1] is wrong)
                 | no [NORMAL] (result[-1] is wrong)
                 | OK (result[-1] is correct)
                 | {timeout} (result[-1] is correct);
```

Like the initial grammar file without annotations, this annotated grammar file recognizes "call Rob", "call Rob Peters", etc. Additionally, it will recognize utterances that indicate if the recognition result from step 1 (here expressed as result[-1]) was correct or incorrect. For example, the explicit indication of correct or incorrect recognition results such as "No, call Julie Thompson" and "OK" as shown above in the examples are captured by the "no [NORMAL]" and "OK" lines in [COMMAND]. Additionally, implicit indications of correctness and incorrectness are captured by the "[NORMAL]" and "{timeout}" lines in the grammar. The first 2 lines in [COMMAND] are annotated to indicate that the result of the previous recognition was incorrect; the last 2 lines indicate that it was correct.

This example syntactic form for the annotated grammar file allows the application to express the correct or incorrect nature of any previous recognition result by putting the correct value in place of the "−1" in this example. The result being annotated as correct or incorrect may be notated by an explicit identifier instead of this relative addressing used in this example. The annotated grammar file syntax allows the grammar file developer to express the flow of information within a dialog.

The feedback mechanisms may derive measures of correctness without grammar file annotations or other application involvement. For example, the feedback mechanism may recognize the use of certain speech templates. The term speech template, as it is used here, expresses a pattern of speech that is used repeatedly in the language. In the examples above, "no, call Julie Thompson" is an instance of such a template. In this case the template in use is "no, <command><target>". In this case, the feedback mechanism may correlate the command in the instance of the template ("call") to a previous recognition result with the same command ("call Judy"). The "no" in the template is a strong indication that the previous recognition result was incorrect. Additionally, this use of this template is a weaker indication that "<command><target>" ("call Julie Thompson") is the correct recognition result for the prior utterance (which was incorrectly recognized as "call Judy"). Note that in this particular example, this weak indicator is wrong. In other words, the part of the second user utterance after the "no" ("call Julie Thompson") is potentially the correct result for the initial recognition (which the system recognized as "call Judy"; the true correct recognition in this example is "call Julie"). In an embodiment, templates may be expressed in a file that is used as input by the feedback generation mechanism.

The feedback module may generate feedback data without application input by analyzing the progression of the dialog. For example, if the feedback module observes that the dialog state is changing, utilizing different grammar files at each step, it may deduce that the recognition of previous utterances was correct or incorrect. This form of analysis is particularly applicable in situations where the feedback module has visibility into multiple dialog states at any particular time, such as in a VoiceXML interpreter or in systems that employ higher-level dialog objects. This is discussed further below.

Though the examples given above are from command-and-control or telephony-based systems, applications of this invention may also be valuable in dictation systems. In this case, the user regularly provides explicit feedback in the case of mis-recognized words or phrases. At the same time, if no corrections are made to a number of terms, this implicitly implies that those terms were correctly recognized. This explicit and implicit feedback may also be applied as described above, to update prediction mechanisms, modify grammar files, etc. For a dictation application, it may be helpful to augment the dictation application user interface to allow the user to differentiate between edits and recognition correction. For example, a heuristic based on phoneme distances may be employed to recognize edits, and prevent them from being confused with corrections of mis-recognitions and employed as negative feedback. Alternatively, an embodiment may utilize natural language processing to determine intent of the recognized text and of the text modified by the user to determine if the modified text is in a correction of a recognition error or an edit. Many mechanisms are possible to distinguish corrections from edits and the invention is not limited in this regard.

Figure 4:
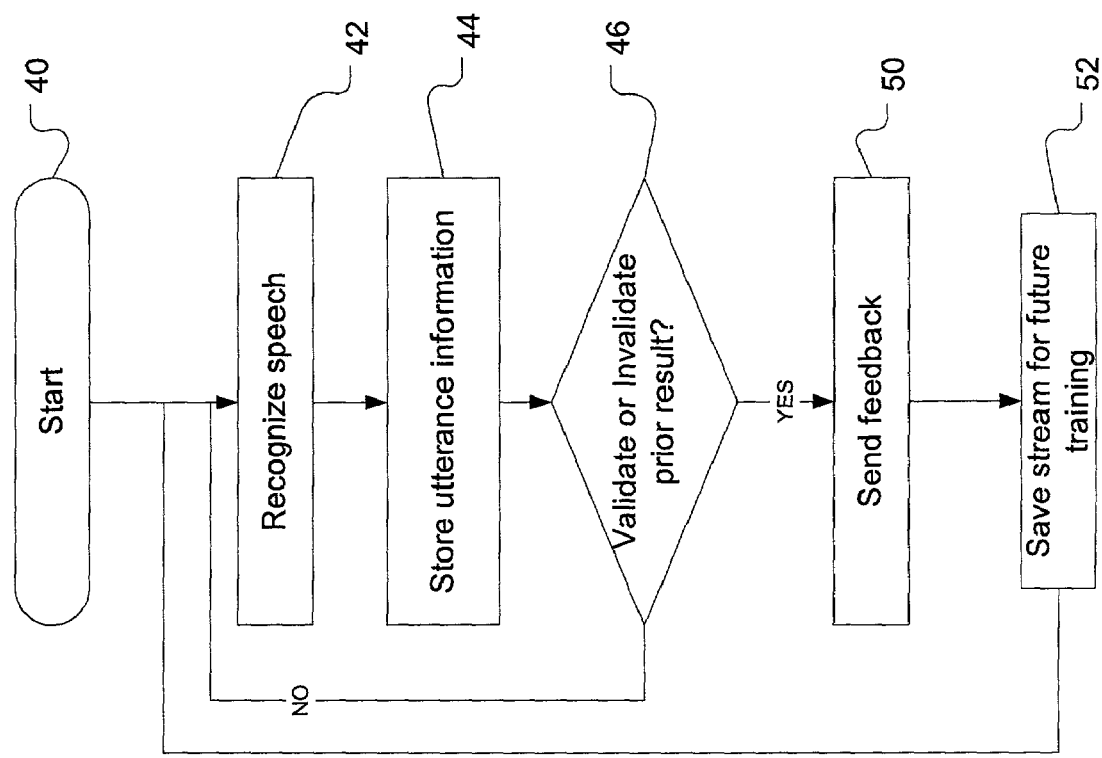
FIG. 4 shows an embodiment of a method to collect feedback in a speech recognition system, in accordance with the invention.
Figure 5:
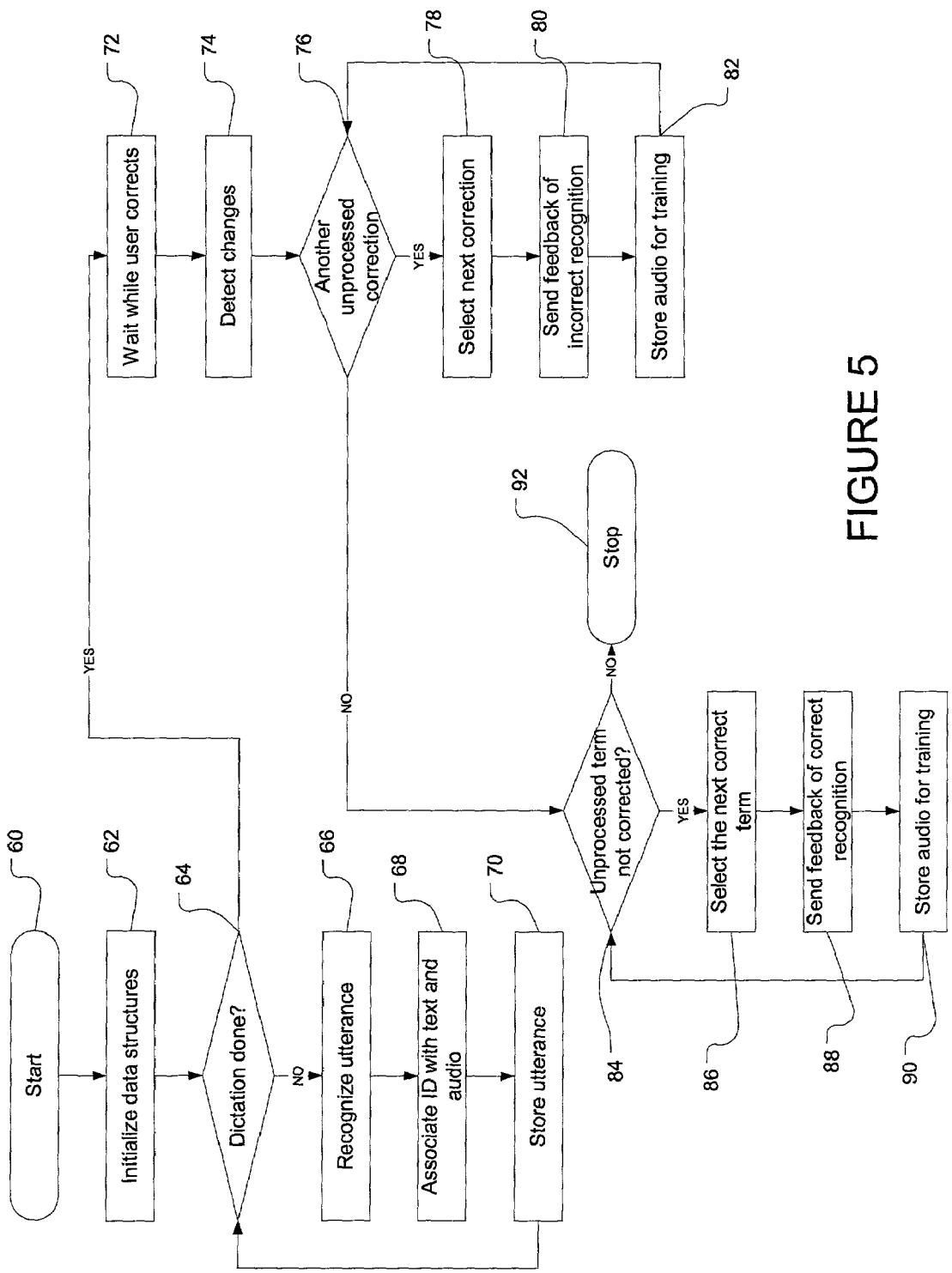
FIG. 5 shows an alternative embodiment of a method to collect feedback in a speech recognition system, in accordance with the invention.

Embodiments of methods for collecting feedback in specific situations are shown in FIGS. 4 and 5. Generally, the embodiments convert an audio input signal to an output signal, and assign an identifier to the audio input signal. The audio input signal, the associated output and the identifier may be stored. The identifier may be a time stamp, index or other characteristic of the input signal to allow access to that signal. As will be seen in the specific examples, the mechanism may also track whether the output signal correctly represents the input signal and possibly the correct output signal if it can be determined. These indications and correct results are collectively called a correction status. The storage of the input signal, output signal and identifier may also include the storage of the correction status, or may only store those signals having a particular status and therefore do not need to store the status.

Turning now to FIG. 4, an embodiment of collecting feedback in a command and control application can be discussed. The process starts at 40. The speech recognition is performed at 42, converting the audio input signal to the output signal. The recognition is performed using whatever grammar file the application may have put in place, which may be annotated, as described above, by the feedback mechanism. At 44, the utterance information is stored. In most cases, the utterance information is the incoming audio input signal waveform, the resulting output signal and an identifier.

At 46, the system determines if the result indicates that a previous recognition result was either correct or incorrect. In one embodiment, this indication is contained in a correction measure. This may be determined, as discussed above, by annotations to the grammar file, may be determined by the speech recognition without application involvement, or may be indicated explicitly to the speech recognition system by the application through an appropriate API. In some cases, the process will have no indications of a prior result being validated or invalidated. In these cases, control proceeds back to state 42. If the result validates or invalidates a previous result, the process proceeds to 50. At 50, feedback data may be provided to a recognizer or other system component capable of utilizing real time feedback, in order to update prediction structures, to update the grammar file, to change the speech models or some other action as discussed above. Alternatively, it may be stored with the utterance information for later use. The process then proceeds to 52, where the utterance information may be annotated and stored for use in a future training set or other offline analysis. Note that both correct and incorrect results may be utilized and stored in this fashion.

Note that this particular example is for 'real-time' use of the feedback data, where the speech models, grammar files and the predictor are updated during the course of an interaction. Alternatively, the entire session could be stored for review after the user has terminated the interaction, allowing the system to be updated off-line. In embodiments of the invention, the feedback data is filtered according to criteria intended to limit storage size, bandwidth or computational requirements. For example, an embodiment may only store utterance and correction information only for utterances that were incorrectly recognized. Another embodiment employing feedback data in real time may only send correction information to the speech recognizer for incorrectly recognized utterances if the computation load on the system is below a certain threshold. There are many possible embodiments and the invention is not limited in this regard.

FIG. 5 shows an embodiment of collecting feedback data in a dictation system. The process starts at 60 and the data structures particular to this task are initialized at 62. The loop from 62 through 70 is repeated during the course of dictation. At 66, the utterance or speech is recognized and converted to text signals. At 68, an identifier is assigned to the utterance, referred to above as the audio input signal waveform. The utterance and its identifier are stored at 70. The process then returns to 64 and determines if the user has completed the dictation. If not, the loop repeats. Note that breaking up a continuous audio stream in a dictation example into discrete utterances may be accomplished in many ways. This example is for discussion purposes and is not intended to limit the scope of the invention to any particular method.

If the user is done, the process moves over to 72 while the user corrects the text resulting from the dictation. This may function as an explicit form of feedback, allowing the system to detect changes between the recognized text and the desired text at 74. As noted above, differentiating between corrections and edits may be accomplished using a variety of heuristics. The system determines if the user has completed corrections at 76. If another unprocessed correction exists, the process moves to 78 where the next correction is performed. The feedback of the incorrect recognition is sent to the predictor, if one is used, at 80, and the corrected text and associated audio are stored at 82 for further use. The process then returns to 76 until all the corrections are processed.

Once all the corrections are processed, the system then determines if there are terms that are unprocessed but not corrected at 84. If there are unprocessed, correct terms at 84, being those the user has not chosen to correct, the system selects the next correct term at 86. It then sends feedback of the correct recognition to the predictor, if used, at 88 and stores the audio for training at 90. If no more unprocessed terms exist at 84, the process ends at 92.

Note that although the embodiment described above was an off line use of feedback data in a dictation application, these application may utilize feedback data in real time as well.

Again, these are specific examples applied to the command and control and dictation applications. However, no limitation to application of the invention is implied or intended. Application of explicit or implicit feedback during the course of an interaction with a speech recognition system may be implemented in several ways. Generally, the feedback will be encapsulated in a feedback data element, where the feedback data element may consist of one or more of the audio input signal, the output signal, contextual information and the correctness measure.

Some embodiments may eliminate the need for explicit instrumentation of grammar files by the application or for an API for use by the application to explicitly provide feedback. In one embodiment, a Voice-XML (eXtended Mark-up Language) interpreter may monitor the output of the recognizer, the grammar files in use and progression of the dialog. It may garner feedback from common terms, analysis of language patterns, progression of dialog states, etc. The Voice XML interpreter may automatically instrument some of the interactions, eliminating the need for explicit feedback. This applies especially to validation and invalidations of prior results in annotated grammars.

In an alternative embodiment, the system may provide higher-level dialog objects which bundle groups of dialog states together into a package used by the application program. For example, a dialog object may be capable of collecting credit card information and have explicit feedback questions in that object. These predefined modules may have outputs that can be taken and used to automatically derive the feedback.

However implemented, if the methods of the invention are implemented in software, the software will generally be included as code on some article in the form of machine-readable code. When the code is executed, it will cause the machine to perform the methods of the invention.

Thus, although there has been described to this point a particular embodiment for a method and apparatus for speech recognition feedback, it is not intended that such specific references be considered as limitations upon the scope of this invention except in-so-far as set forth in the following claims.

What is claimed is:

1. A speech recognition system, comprising:
    at least one recognizer to produce output signals from audio input signals based at least in part on speech models and a grammar file, the grammar file including at least one command syntax;
    a feedback module to generate feedback data, the feedback module modifying the speech models and the grammar file based on the feedback data to improve the performance of the at least one recognizer; and
    a controller adaptable to select one recognizer based at least in part on the feedback data from the at least one recognizer for an input utterance, the selected recognizer performing most accurately for the input utterance among the at least one recognizer.

2. The speech recognition system of claim 1, wherein the controller is operable to coordinate production of the output signals.

3. The speech recognition system of claim 1, wherein the controller is adaptable to provide the feedback data to the at least one recognizer wherein the at least one recognizer is operable to receive the feedback data.

4. The speech recognition system of claim 1, wherein the controller is adaptable to store the feedback data in a storage.

5. The speech recognition system of claim 1, wherein the feedback module modifies the grammar file by updating the grammar file to include a weighting for possibilities based upon the feedback data.

6. The speech recognition system of claim 1, where the feedback module is adapted to generate the feedback data based on internal analysis of at least one of the grammar file, dialog progression, or the output signals.

7. The speech recognition system of claim 1, wherein the feedback module is adapted to generate the feedback data based on external inputs comprising at least one of an annotated grammar file or information received through an application programming interface.

* * * * *